United States Patent [19]
Tabuchi

[11] Patent Number: 5,481,629
[45] Date of Patent: Jan. 2, 1996

[54] HYBRID OPTICAL IC WITH OPTICAL AXES AT DIFFERENT LEVELS

[75] Inventor: Haruhiko Tabuchi, Kawasaki, Japan

[73] Assignee: Fujitsu Limited, Kawasaki, Japan

[21] Appl. No.: 251,284

[22] Filed: May 31, 1994

[30] Foreign Application Priority Data

Aug. 31, 1993 [JP] Japan .................................. 5-216632

[51] Int. Cl.⁶ .................................................. G02B 6/122
[52] U.S. Cl. .............................. 385/14; 385/35; 385/49; 385/89
[58] Field of Search .................................. 385/49, 50, 52, 385/88–94, 14, 31, 33, 35

[56] References Cited

U.S. PATENT DOCUMENTS

| | | | |
|---|---|---|---|
| 4,466,696 | 8/1984 | Carney | 385/88 X |
| 4,787,696 | 11/1988 | Norris et al. | 385/90 X |
| 4,802,727 | 2/1989 | Stanley | 385/89 |
| 4,875,750 | 10/1989 | Spaeth et al. | 385/35 |
| 5,163,108 | 11/1992 | Armiento et al. | 385/89 |
| 5,321,786 | 6/1994 | Valette et al. | 385/92 |

FOREIGN PATENT DOCUMENTS

| | | |
|---|---|---|
| 0331338 | 9/1989 | European Pat. Off. . |
| 3731311 | 3/1989 | Germany . |
| 4013630 | 12/1990 | Germany . |
| 92/00538 | 1/1992 | WIPO . |

OTHER PUBLICATIONS

Blonder, Greg E., "Silicon Optical Bench Research at AT&T Bell Laboritles," *LEOS '90—IEEE Lasers and Electro–Optics Society Annual Meeting Conference Proceedings*, vol. 2, IEEE Catalog #90CH2906-6, Nov. 4–9, 1990, Boston, Mass., pp. 350–353.

*Primary Examiner*—John D. Lee
*Attorney, Agent, or Firm*—Staas & Halsey

[57] ABSTRACT

An integrated optical device including: a silicon substrate (1); an optical waveguiding core (4) formed on the silicon substrate (1); a clad layer formed encircling the optical waveguiding core (4): an optical fiber groove (5) having a V-character shaped cross section for position-aligning an optical fiber so as to optically couple the optical waveguiding core and the optical fiber, the optical fiber groove being formed on the surface of the silicon substrate along an optical axis in one direction from one end plane of the optical waveguiding core; an edge input/output type optical semiconductor device (8) having an active region bonded to the clad layer, the optical semiconductor device being mounted on a line extending from the other end plane of the optical waveguiding core along the optical axis; and an optical axis level changing member (10, 11, 12) for optically coupling the optical waveguiding core and the optical semiconductor device by changing the heights of optical axes relative to the surface of the silicon substrate at both the optical semiconductor device and the optical waveguiding core.

29 Claims, 12 Drawing Sheets

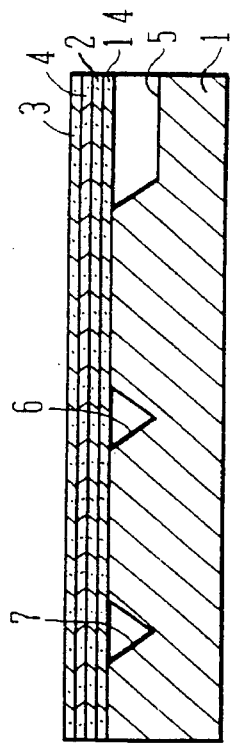
FIG.3A
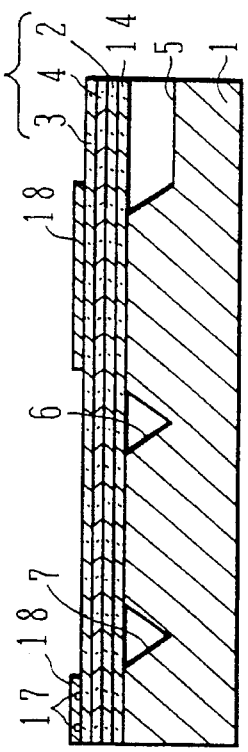
FIG.3D
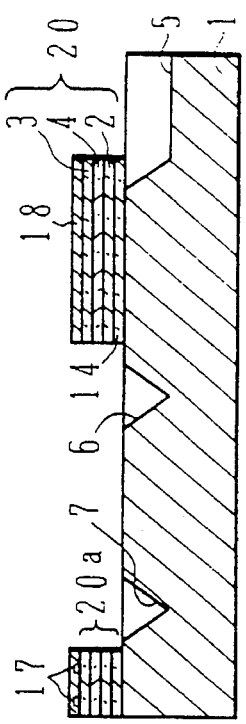
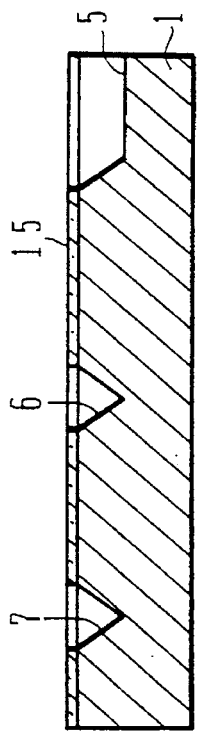
FIG.3B
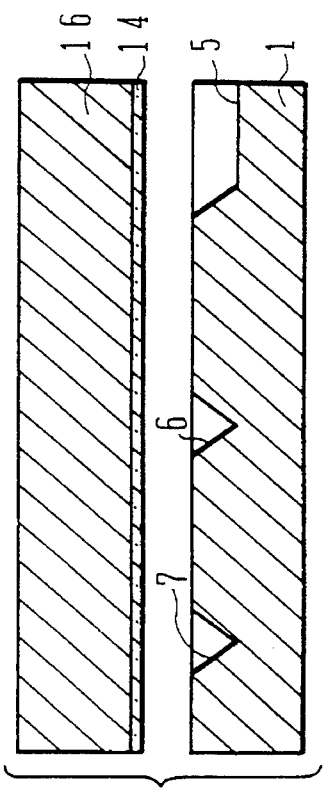
FIG.3E
FIG.3C
FIG.3F

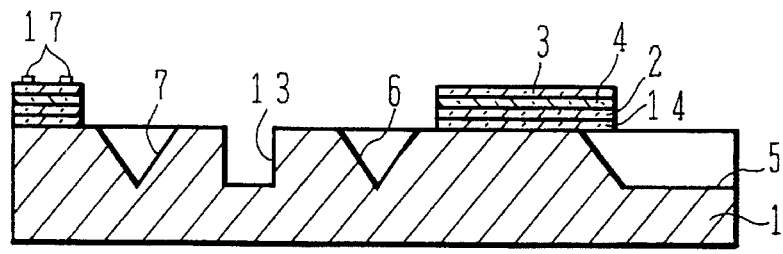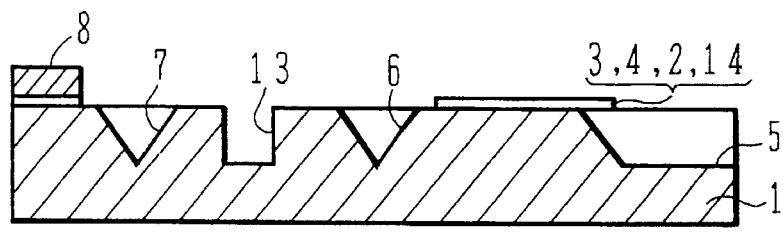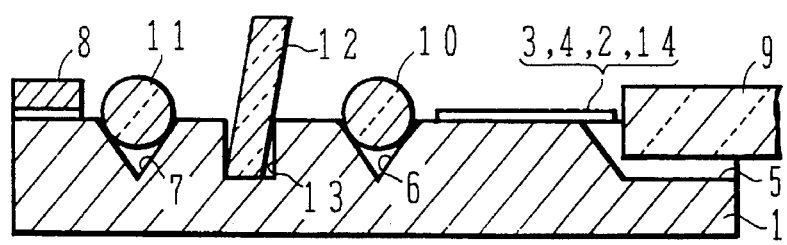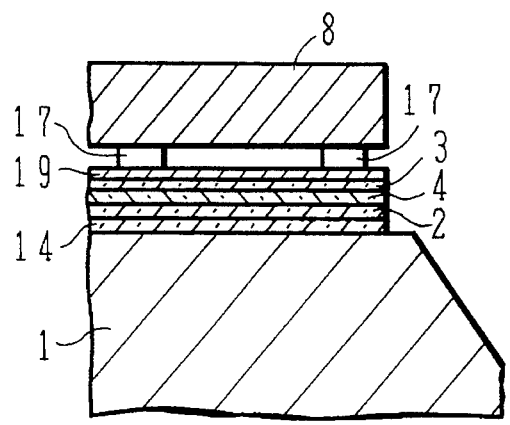

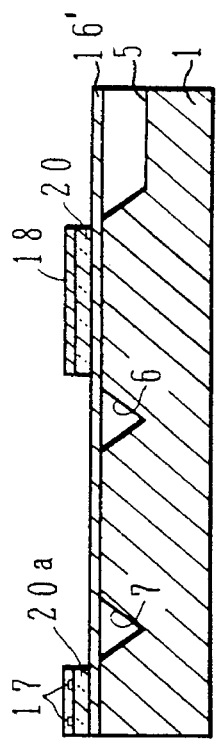
FIG.4A
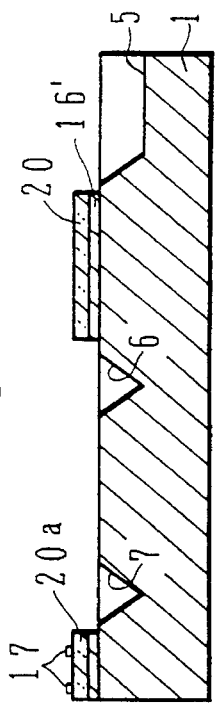
FIG.4D
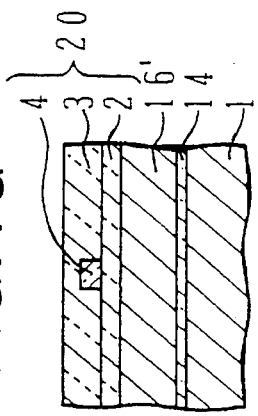
FIG.4G
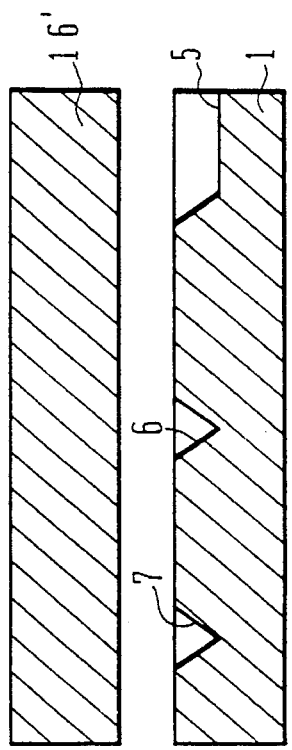
FIG.4B
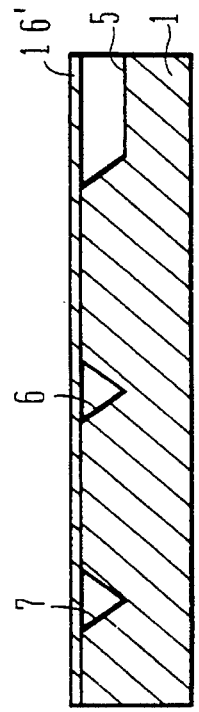
FIG.4E
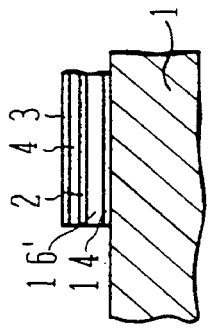
FIG.4F
FIG.4C

HYBRID OPTICAL IC WITH OPTICAL AXES AT DIFFERENT LEVELS

BACKGROUND OF THE INVENTION a) Field of the Invention

The present invention relates to an integrated optical device, and, more particularly, to a hybrid integrated optical device having optical fibers, optical waveguides, and optical semiconductor devices integrated on a single substrate.

b) Description of the Related Art

A conventional integrated optical device will be described with reference to FIGS. 9 to 13.

FIG. 9 is a perspective view of a conventional optical IC disclosed in Japanese Patent Laid-open Publication No. 57-84189. Semiconductor laser guides (recesses) 58 are formed on a substrate 51, and semiconductor lasers 57 are fitted in the semiconductor laser guides 58 and fixed thereto.

Laser beams emitted from the three semiconductor lasers 57 are converged by a cylindrical lens 54 aligned in a lens guide groove 55 formed on the substrate 51, and guided to three light incident planes of an optical waveguide 52 formed on the substrate 51. The optical waveguide 52 guides the three beams, incident to the three light incident planes separately at first, and then multiplexes or joins them at the junction region thereof to output the same, as a composite laser beam, from a single output plane thereof.

Along the optical axis of the outputted laser beam, a V groove 56 for guiding an optical fiber 53 is formed on the substrate 51, starting from the position corresponding to the light output plane to one end of the substrate 51. The optical fiber 53 is fitted in, and fixed to, the V groove 56.

The positions of the semiconductor lasers 57 and optical fiber 53 are therefore aligned by the semiconductor laser guides 58 and V groove 56 to provide optical coupling therebetween.

FIGS. 10A to 10F illustrate two different procedures of forming the optical fiber guiding V groove 56 (hereinafter simply called a V groove) and the optical waveguide 52 of the integrated optical device shown in FIG. 9. In the procedure illustrated in FIGS. 10A to 10C, an optical waveguide is formed after a V groove has been formed.

As shown in FIG. 10A, an $SiO_2$ film 62 is formed on the surface of a silicon substrate 61 having the (100) plane, and an opening 63 to be used for V groove etching is formed in the $SiO_2$ film 62 by photolithography. By using the $SiO_2$ film 62 as a mask, a V groove 64 is formed by anisotropic etching by using potassium hydroxide (KOH) aqueous solution, as shown in FIG. 10A.

As shown in FIG. 10B, a lower cladding layer 65 is formed on the whole surface of the $SiO_2$ film. Next, an core region 66 having a relatively high refractive index is formed on the lower cladding layer 65 and patterned. An upper cladding layer 67 is then formed on the core region 66. As shown in FIG. 10C, the lower cladding layer 65, core region 66, and upper cladding layer 67 are selectively etched to form an end plane of the optical waveguide. This end plane corresponds to a light input/output port of the Planar wave guide.

The procedure illustrated 10D to 10F forms an optical waveguide before a V groove is Formed. As shown in FIG. 10D, a lower cladding layer 65, an optical waveguide core layer 66, and upper cladding layer 67 are formed on a silicon substrate 61 in the manner similar to the step of FIG. 10B.

Next, as shown in FIG. 10E, the lower cladding layer 65, core region. 66, and upper cladding layer 67 are selectively etched to form an opening 68 to be used for V groove etching. As shown in FIG. 10F, by using the optical waveguide components 65, 66, and 67 as a mask, the silicon substrate 61 is anisotropically etched to form a V groove 64.

With the method of forming an optical waveguide after a V groove has been formed, materials of the optical waveguide components are also deposited on the V groove 64 while the optical waveguide formed. It is difficult to remove such materials on the V groove while maintaining the design configurations off the V groove and optical waveguide, because the V groove is as deep as 100 μm usually.

With the method of forming an optical waveguide before a V groove is formed, the optical waveguide films 65, 66, and 67 are side-etched when the V groove etching opening 68 is formed, because the optical waveguide is thick. It is therefore difficult to form the V groove 64 precisely.

Further, as seen in FIG. 9, the semiconductor laser 57 is fitted in the semiconductor laser guide 58 and bonded thereto in a junction-up position (with a heterojunction located upside). However, spatial allowance for the height of the active region of a semiconductor laser is above (i.e., greater than) +/−10 μm, so that it is difficult to make the core region of a waveguide, to be coupled thereto flush with the active region.

Furthermore, the width of a semiconductor laser chip and the relative positions of the active region from opposite side surfaces have a dimensional allowance of above +/−10 μm. Whereas, the position displacement less than +/−3 μm is usually required for single-mode waveguide.

Therefore, the practical position displacement is large compared to the required precision if simply a semiconductor laser is fitted in the semiconductor laser guide 58, so that it is difficult to obtain sufficient coupling with an optical waveguide.

Still further, in forming bonding pads on the bottom wall of the semiconductor laser guide 58 by photolithography for bonding the semiconductor laser 57 thereto, the exposed image of a pattern has blurred edges because of the steps of the optical waveguide and the laser guide groove, so that it is difficult to provide precise position alignment. Yet still further, the V groove 56, which is very deep for photolithographic process, prevents fine work.

FIG. 11 shows an example of an integrated optical device disclosed in Japanese Patent Laid-open Publication No. 61-46911. As shown, an optical fiber guide 72, an optical waveguide 73, and semiconductor laser guides 74 are formed on a substrate 71.

A semiconductor laser 75 having an active region 75a and a photodetector 76 are aligned with the semiconductor laser guides 74 and fixed thereto.

In the example shown in FIG. 11, if a usual optical fiber 77 having a clad diameter of 125 μm is used, it is necessary to set the height of the center of the core of the optical waveguide to 62.5 μm, and the height of the optical fiber guide 72 becomes obviously higher than 62.5 μm.

Therefore, if an $SiO_2$ optical waveguide of high reliability is to be formed, it takes a long time to deposit the optical waveguide materials and etch and pattern the optical waveguide structure and guide structure.

Like the example shown in FIG. 9, the dimension allowance of the height of the active layer of a semiconductor laser and edge the positions of active region from its opposite side edges is above +/−10 μ, so that it is difficult to make the active region 75a of the semiconductor laser 75 flush with the core region of the optical waveguide 73. The position alignment is particularly difficult if a single mode fiber and a single mode optical waveguide, which usually requires accurate positioning less than +/–3 mn, are used.

FIG. 12 shows an example off an integrated optical device disclosed in Japanese Patent Laid-open Publication No. 2-58005. As shown, an optical waveguide 87, and bonding pads 81, 82, and 83 are formed on a substrate 80.

A bonding pad 86 is formed on the bottom of a semiconductor laser 84 and bonded to the bonding pad 82 on the substrate 80. In this case, the semiconductor laser 84 can be position-aligned precisely because, if there is any misalignment, the bonding pad 86 makes a short circuit between the bonding pad 82 and the bonding pad 81 or 83.

However, a fine pattern of the bonding pads 81, 82, and 83 is difficult to be formed by photolithography because there is a step of the optical waveguide 87. It is therefore difficult to precisely align the active layer (or region) 85 of the semiconductor laser 84 with the core of the optical waveguide 87.

As described above, precise optical coupling between a semiconductor laser and an optical waveguide or between an optical waveguide and an optical fiber is difficult because the pattern formed by photolithography has blurred edges because of steps of the optical waveguide and the like or because of the dimension allowance of the active layer of the semiconductor laser.

If materials of an optical waveguide enter a V groove, it is difficult to remove such materials while maintaining the designed configuration of the V groove.

SUMMARY OF THE INVENTION

It is an object of the present invention to provide an integrated optical device and a manufacturing method therefore which are capable of position-aligning optical fibers, optical waveguides and optical semiconductor devices, easily and precisely.

According to one aspect of the present invention, there is provided an integrated optical device having: a silicon substrate; a planar optical waveguide which is formed partially on the surface of the silicon substrate, and has a light guiding core region of high refractive index surrounded by a lower-index cladding layer and a flat top surface; a bonding pedestal which is formed partially on the surface of the silicon substrate occupying a portion different from the portion occupying the planar optical waveguide and has a flat top surface, the height of the flat top surface of the bonding pedestal and the planar optical waveguide From the surface of the silicon substrate being the same; a V groove having a V-shaped cross section for position-aligning an optical fiber so as to optically couple the planar optical waveguide and the optical fiber, the V groove being formed on the surface of the silicon substrate along an optical axis extending in one direction from one light input/output port of the optical waveguide; an edge input/output type optical semiconductor device bonded on the top surface of said bonding pedestal, the optical semiconductor device being mounted on a line extending from the other light input/output port of the optical waveguide along the optical axis; and optical axis level changing means for optically coupling the optical waveguide and the optical semiconductor device by changing the heights of optical axes relative to the surface of the silicon substrate at both the active region of the optical semiconductor device and the core region of the planar optical waveguide.

Preferably, the optical axis level changing means includes: a first lens for collimating a light beam emitted from the optical semiconductor device or converging a collimated light beam into the optical semiconductor device; a first lens guide hole formed on the surface of the silicon substrate for position-aligning the first lens on the surface of the silicon substrate; a second lens for converging a collimated light beam into the optical waveguide or collimating a light beam emitted from the optical waveguide; and a second lens guide hole formed on the surface of the silicon substrate for position-aligning the second lens on the surface of the silicon substrate; an optical member for refracting a light beam to change the heights of the optical axes, the optical member being provided between the first and second lenses; and an optical member guide groove formed on the surface of the silicon substrate for position-aligning the optical member on the surface of the silicon substrate.

The optical member may include a transparent plate made of a material transparent relative to the wavelength of a transmission light beam, the light incident and output planes of the transparent plate being disposed to be inclined by a predetermined angle from an optical axis of incident ray.

The optical member may include a transparent plate having both opposite planes disposed to be inclined by a predetermined angle from an optical axis, and two support members having one planes disposed perpendicular to an optical axis, and the other planes disposed in tight contact with the light incident and output planes of the transparent plate, the two support members each being formed with a through hole at the region where a light beam is transmitted.

According to another aspect of the present invention, there is provided a method of forming an integrated optical device including the steps of:forming a V groove and first and second lens guiding grooves for position-aligning lenses by selectively etching the surface of a silicon substrate through anisotropic etching; bonding another silicon substrate having an $SiO_2$ film formed on the surface of the other silicon substrate to the silicon substrate, by directing the $SiO_2$ film to the surface of the silicon substrate; removing the other silicon substrate and leaving the $SiO_2$ film for a planarizing layer; forming a deposited layer for optical waveguide by depositing cladding layer material and core material of core region on the $SiO_2$ film, by patterning the layer for core region through photolithography; and by depositing upper cladding layer material so as to planarize the top surface of the planar waveguide and cover the core region; forming bonding pads for bonding an optical semiconductor device all the place which corresponds to the bonding pedestal on the top surface of the deposited layer for the planar waveguide; selectively etching the deposited layers for optical waveguide and the $SiO_2$ film, forming waveguide and light input/output ports, bonding pedestal and exposing the V groove and the first and second lens guiding grooves; and forming an optical member guide groove suitable for position-aligning an optical member for shifting the levels of optical axes, on the surface of the silicon substrate between the first and second lens guiding grooves.

Bonding pads for bonding an optical semiconductor device can be formed on a flat, top surface off the deposited layers for optical waveguide so that patterns can be formed at high precision. If an optical semiconductor device is flip-chip bonded, the active region of the optical semiconductor device can be positioned at high precision irrespective of its outer dimension.

An optical axis can be shifted by disposing an optical member to be inclined relative to the optical axis of incident light beam. It is therefore possible to optically couple the optical waveguide and the active region of the optical semiconductor device both having dirt etcher heights from the substrate surface.

The optical member may be of a three-layer structure made of transparent optical members having different refractive indices. By inclining the interfaces between the three layers, it is possible to dispose the light incident and output planes perpendicularly to the optical axis. It is therefore possible to improve the position alignment precision of the optical member.

Birefringence material may be used for the optical member to allow the light incident and output planes to be disposed perpendicularly to the optical axis, to thereby improve the position alignment precision of the optical member.

By covering the openings of the V grooves for positioning an optical fiber and other grooves with an $SiO_2$ film / or a silicon layer, it is possible to prevent the materials of an optical waveguide from being entered into the grooves when the planar optical waveguide is formed.

If a thick silicon layer is used to cover the V groove for optical fiber guide and other grooves, the core region of an optical waveguide can be made much higher than the surface of the substrate. Accordingly, the diameter of a laser beam can be made larger to thus improve the optical coupling tolerance.

As described above, an optical semiconductor device such as a semiconductor laser and an optical fiber can be optically coupled with highly precise position alignment without any adjustment. It is therefore possible to easily manufacture a hybrid optical transceiver widely used by optical communications.

BRIEF DESCRIPTION OF THE DRAWINGS

FIGS. 3A to 3J are cross-sectional views explaining a method of manufacturing an integrated optical device according to the first embodiment off the present invention.

FIGS. 4A to 4G are cross-sectional views explaining a method of manufacturing an integrated optical device according to a second embodiment of the present invention.

DETAILED DESCRIPTION OF THE PREFERRED EMBODIMENTS

The first embodiment of the invention will be described with reference to FIGS. 1 to 4G.

Figure 1:
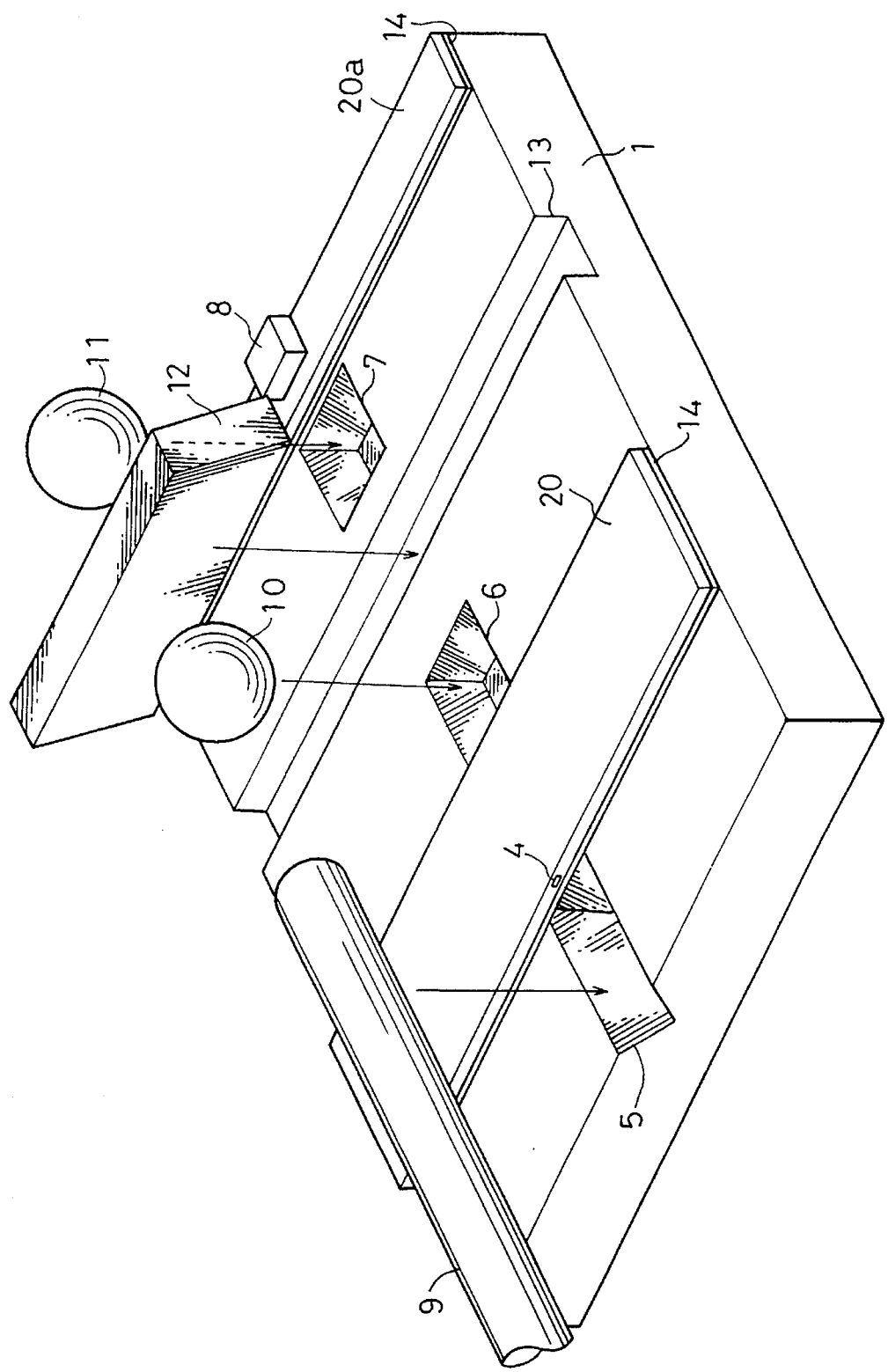
FIG. 1 is a perspective view of an integrated optical device according to a first embodiment of the present invention.
Figure 2B:
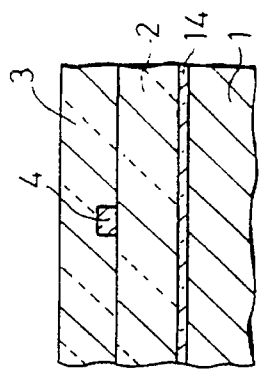
FIGS. 2A and 2B are cross-sectional, views of the integrated optical device of the First embodiment.
Figure 2A:
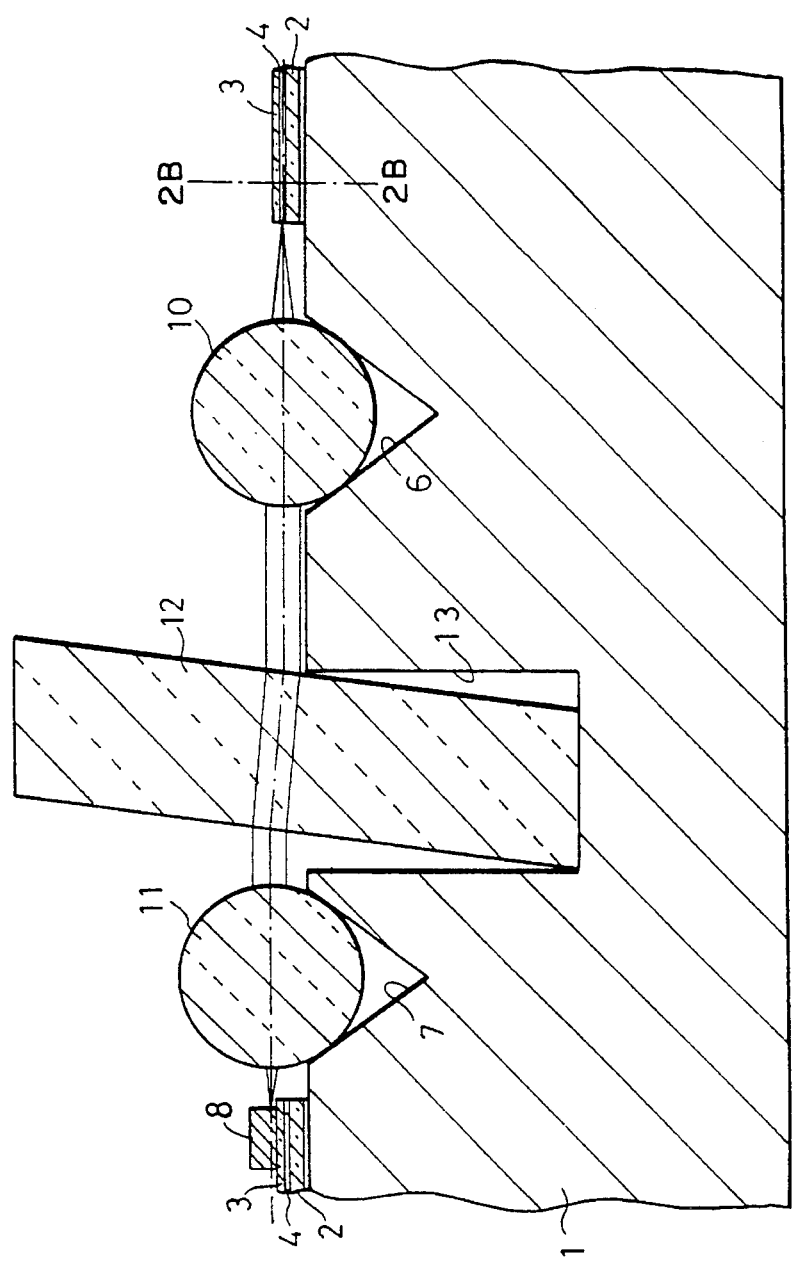

FIG. 1 is a perspective view of an integrated optical device of the first embodiment, and FIGS. 2A and 2B are cross sectional views of the device shown in FIG. 1. FIG. 2B is a cross sectional view taken along line 2B—2B of FIG. 2A.

Optical waveguides 20 are formed partially on the surface of a silicon substrate 1 having the (100) plane, with an $SiO_2$ film 14 being interposed therebetween. The $SiO_2$ film 14 is used for a planarizing layer. The optical waveguide 20 is constructed of a lower cladding layer 2, an upper cladding layer 3, and a core region 4 surrounded by the cladding layers 2 and 3 (FIGS. 2A and 2B). For example, the cladding layers are made of $SiO_2$ and the core region is made of a Ge doped $SiO_2$.

A V groove 5 is formed on the surface of the silicon substrate, extending in one direct:ion along the optical axis from the a first end of the waveguide 20 which corresponds to a light input/output port. An optical fiber 9 is fitted in, and fixed to, the V groove 5, which provides position alignment between the optical fiber 9 and the optical waveguide 20.

A spherical lens 10, a rectangular optical member 12, a spherical lens 11, and an optical semiconductor device 8 are disposed in this order along the optical axis from the other, second end of the waveguide 20. The optical semiconductor device 8 is flip-chip bonded on the layer 20a which corresponds to a bonding pedestal. The waveguide 20 and the bonding pedestal 20a are formed coincidently and are formed by the same processes.

The active region of the optical semiconductor device 8 is therefore at a position higher than the core region 4. For the optical coupling between the optical fiber 9 and the optical semiconductor device 8, it is therefore necessary to displace the optical axis by an amount equal to the difference of the heights. From this reason, the spherical lens 10, the rectangular optical member 12, and spherical lens 11 are provided.

To align the positions of the spherical lenses 10 and 11, V grooves 6 and 7 for guiding the lenses are formed on the surface of the silicon substrate 1. The lens guiding V grooves 6 and 7 may be of an up-side-down truncated pyramidal shape as shown in FIG. 1, or of an up-side-down pyramidal shape as shown in FIG. 2A. The lengths off sides of the pyramid are determined so as to make the optical axis pass through the respective centers of the spherical lenses 10 and 11 which are fitted in the corresponding V grooves, and.

The rectangular optical member 12 is disposed so that the light incident and output planes of the optical member 12 are tilted by a predetermined angle relative to the optical axis so as to shift the optical axis by a desired height. A guide groove 13 is Formed on the surface of the silicon substrate 1 for positioning the rectangular optical member 12.

The width and depth of the guide groove 13 are determined from the-thickness of the rectangular optical member 12 so that the optical member 12 inserted into the guide groove 13 can be inclined by a desired angle.

The thickness of the silicon substrate is about 1 mm, the diameter of the optical fiber 9 is 125 µm, the diameters of the sphere lenses 10 and 11 are 0.8 mm, the height of the optical axis of the semiconductor laser 8 from the surface of the bonding pedestal 20a is 6 µm, the thickness of the SiO$_2$ film 14 is 2 µm, the total thickness of the optical waveguide 20 and bonding pedestal 20a are 28 µm, and the height of the core 4 of the optical waveguide from the surface of the silicon substrate 1 is 20 µm.

FIGS. 3A to 3J are cross sectional views explaining a method of manufacturing an integrated optical device according to the first embodiment.

As shown in FIG. 3A, an SiO$_2$ film 15 is formed on the surface of a silicon substrate 1 having the (100) plane and a thickness of 1 mm. Openings are formed in the SiO$_2$ film 15 at the positions where a V groove 5 and lens guiding grooves 6 and 7 are formed. By using the SiO$_2$ film as a mask, the silicon substrate is selectively etched by potassium hydroxide (KOH) aqueous solution.

The KOH aqueous solution is anisotropic etchant having a very low etching speed in the (111) plane so that the (111) plane appears on the side walls of the etched grooves. After the silicon substrate 1 has been etched, the SiO$_2$ film 15 used as the mask is removed (FIG. 3B).

In this process, a thin SiO$_2$ film 15 less than 2 µm can be used as the etching mask for the V groove 5 and lens guiding V grooves 6 and 7, allowing the V grooves to be etched precisely.

In a conventional process, a SiO$_2$ film as thick as above 3 µm is used as the etching mask, because an KOH aqueous solution slightly corrodes SiO$_2$ and the residual SiO$_2$ film must be used as an isolator layer for wiring patterns on the surface.

As shown in FIG. 3B, a silicon substrate 16 is prepared which is formed with an SiO$_2$ film 14 on the surface of the silicon substrate, the SiO$_2$ film having a thickness of 2 µm. This silicon substrate is bonded to the silicon substrate 1, as formed in the process of FIG. 3A, by directing the surface with the V grooves of the silicon substrate 1 to the surface with the SiO$_2$ film of the silicon substrate 16. This bonding may be performed by using chemical bonding between molecules. For example, both the substrates can be bonded together by heating them, while placed one upon the other, at 1000° C. for about one hour. A voltage may be applied between the silicon substrates to assist their bonding.

As shown in FIG. 3C, after both the substrates are bonded together, the silicon substrate 16 is removed by grinding/or polishing and etching. The substrate 1 of a two-layer structure can thus be obtained, covering the openings of the V groove 5 and lens guiding V grooves 6 and 7 with the SiO$_2$ film 14 which acts as a planarizing layer.

As shown in FIG. 3D, a layer serving as a lower cladding layer 2, a core region 4, and an upper cladding layer 3 are deposited on the SiO$_2$ film 14. The layer for core region 4 is patterned by photoetching to form the core region. Since the V groove 5 and lens guiding V grooves 6 and 7 are covered with the planarizing layer of SiO$_2$ film 14, materials of the optical waveguide components will not enter the V grooves.

As shown in FIG. 3E, bonding pads 17, for bonding thereto an optical semiconductor device 8, are formed on the layer for cladding layer 3 at predetermined positions. Next, a mask 18 is formed covering the bonding pads 17 and the regions where optical waveguide 20 and bonding pedestal 20a are formed.

As shown in FIG. 3F, after the mask 18 has been formed, an unnecessary region of the deposited layer 20b, formed by the layer for cladding layers 2 and 3 and core region and an unnecessary region, of the SiO$_2$ film 14 are etched to expose the V groove 5 and lens guiding V grooves 6 and 7. An amorphous silicon mask and a reactive-ion-beam-etching technique may be used for the processes, respectively.

As shown in FIG. 3G, the mask 18 is removed to expose the bonding pads 17. Next, a rectangular guide groove 13 is formed by using a dicing saw. Next, as shown in FIG. 3H, the optical semiconductor device 8 having bonding pads is flip-chip bonded to the bonding pads 17.

In FIGS. 3A to 3G, the SiO$_2$ film 14 and optical waveguide 20 are shown thicker that the actual dimensions thereof, for the easy understanding of the description. In FIG. 3H, however, the SiO$_2$ film and optical waveguide 20 are shown thinner, matching the actual scale.

Next, as shown in FIG. 3J, the spherical lenses 10 and 11 and the rectangular optical member 12 are fitted in the lens guiding V grooves 6 and 7 and V groove 13, respectively. A laminated thin optical isolator may be used as the rectangular optical member 12.

As shown in FIG. 3J, a metal film 19 may be formed on the surface of the cladding layer 3 to enhance heat dissipation.

According to the first embodiment, face-down flip-chip bonding is used for bonding the optical semiconductor device 8 so that position alignment of a relatively high precision can be obtained even if the outer dimension of the optical semiconductor device is different from the original design. The integrated optical device manufactured by the method of this embodiment has a displacement of 2 µm or less from a target position of the optical semiconductor device.

The positions and pattern of the bonding pads 17 are precise because they are formed on a flat surface as shown at the process step of FIG. 3E.

The second embodiment off the invention will be described with reference to FIGS. 4A to 4F. The second embodiment is characterized by a use of a silicon layer in place of the SiO$_2$ film of the first embodiment, and the other structures are the same as the first embodiment.

FIGS. 4A to 4F illustrate the steps of manufacturing an integrated optical device according to the second embodiment of the invention. Similar elements to those shown in FIGS. 3A to 3J are identified by identical reference numerals.

As shown in FIG. 4A, a silicon substrate 1 is prepared which has a V groove 5 and lens guiding V grooves 6 and 7 formed in the same manner as the process of FIG. 3A. This silicon substrate 1 is bonded to another silicon substrate 16, by directing the surface with the V grooves of the silicon substrate 1 to the surface off the silicon substrate 16. As shown in FIG. 4B, the silicon substrate 16 is ground and polished to leave the silicon layer 16' having a thickness of 50 µm. In this manner, a substrate off a two-layer structure is obtained wherein the SiO$_2$ film 14, which serves as an planarizing layer, at the process off FIG. 3C of the first embodiment is replaced by the silicon layer 16, which serves as an planarizing layer too.

Next, as shown in FIG. 4C, in the same manner as the processes shown in FIGS. BD and BE of the first embodiment, a layer for an optical waveguide 20b, bonding pads 17, and a mask 18 are formed on the silicon layer 16. The layer for the optical waveguide 20b is formed by two clad layers and core sandwiched therebetween. In FIGS. 4C to 41E, the layer for optical waveguide 20b is shown as a single layer.

As shown in FIG. 4D, the exposed silicon layer 16' is etched out. If a KOH aqueous solution is used as etchant, the surfaces of the V groove 5 and lens guiding V grooves 6 and 7 are scarcely etched.

Thereafter, processes similar to the processes of FIGS. 3G to 3I are performed to Form an integrated optical device having the silicon layer 16' in place of the $SiO_2$ film of the first embodiment.

In the second embodiment, when the unnecessary region of the layer 20b is etched to leave the necessary region for optical waveguides 20 and bonding pedestal 20a, the silicon layer 16' functions as an etching stop layer, thereby improving the etching controllability.

Furthermore, since a thick silicon layer is easy to form as compared to an $SiO_2$ film, the height of the optical axis from the surface of the silicon substrate 1 can be made greater. As a result, the diameter of a light beam can be made large and the optical coupling tolerance can be improved.

As the silicon substrate 16, a single crystal silicon substrate as well as an amorphous silicon substrate can be used. As shown in the side view of FIG. 4F and the cross section of FIG. 4G, the silicon layer 16' may be left between the $SiO_2$ film 14 and optical waveguide 20 of the first embodiment (see, FIG. 3F).

Next, the third embodiment of the invention will be described with reference to FIG. 5.

Figure 5:
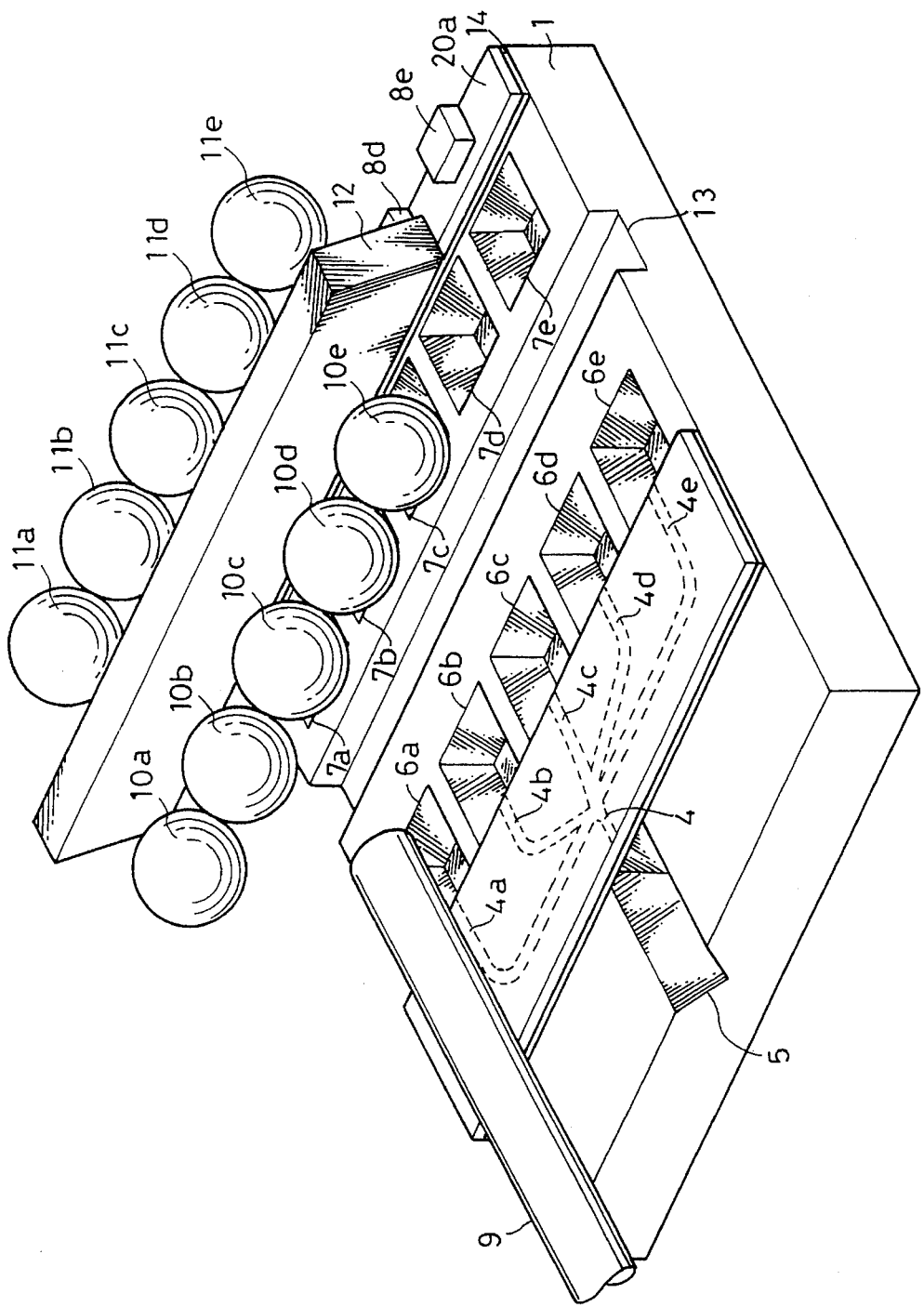
FIG. 5 is a perspective view of an integrated optical device according to a third embodiment of the present invention.

FIG. 5 shows an integrated optical device of the third embodiment. The optical waveguide of the integrated optical device shown in FIG. 5 has five core regions 4a to 4e and one core region 4 which constitute an optical multiplexer. Semiconductor lasers 8a to 8e having different oscillation wavelengths are used as optical semiconductor devices to constitute a light source for multiple wavelength optical communications.

Laser beams radiated from the semiconductor lasers 8a to 8e pass through spherical lenses 11a to 11e and become incident onto a rectangular optical member 12. The optical axes of the laser beams are shifted down by the rectangular optical member 12, and the beams pass through spherical lenses 10a to 10e and become incident onto the core regions 4a to 4e.

The spherical lenses 10a to 10e, and 11a to 11e are aligned at predetermined positions (in-plane positions and heights) by lens guiding V grooves 6a to 6e, and 7a to 7e., respectively, and fixed thereto. In a manner similar to embodiment shown in FIG. 1, the rectangular optical member 12 is inclined by a predetermined angle relative to the optical axes by a guide groove 13, and fixed thereto.

The laser beams incident onto the core regions 4a to 4e are converged to the core region 4 and become incident upon an optical fiber 9 fixed by the V groove 5.

As described above, an optical multiplexer is formed by a multiplicity of optical semiconductor devices and spherical lenses and optical waveguides. A light source for multiple wavelength optical communications can thus be manufactured without any adjustment. By using the similar structure, an integrated optical device having an optical demultiplexer (wave-dividing) function may be formed.

Next, the fourth embodiment of the invention will be described with reference to FIG. 6.

Figure 6:
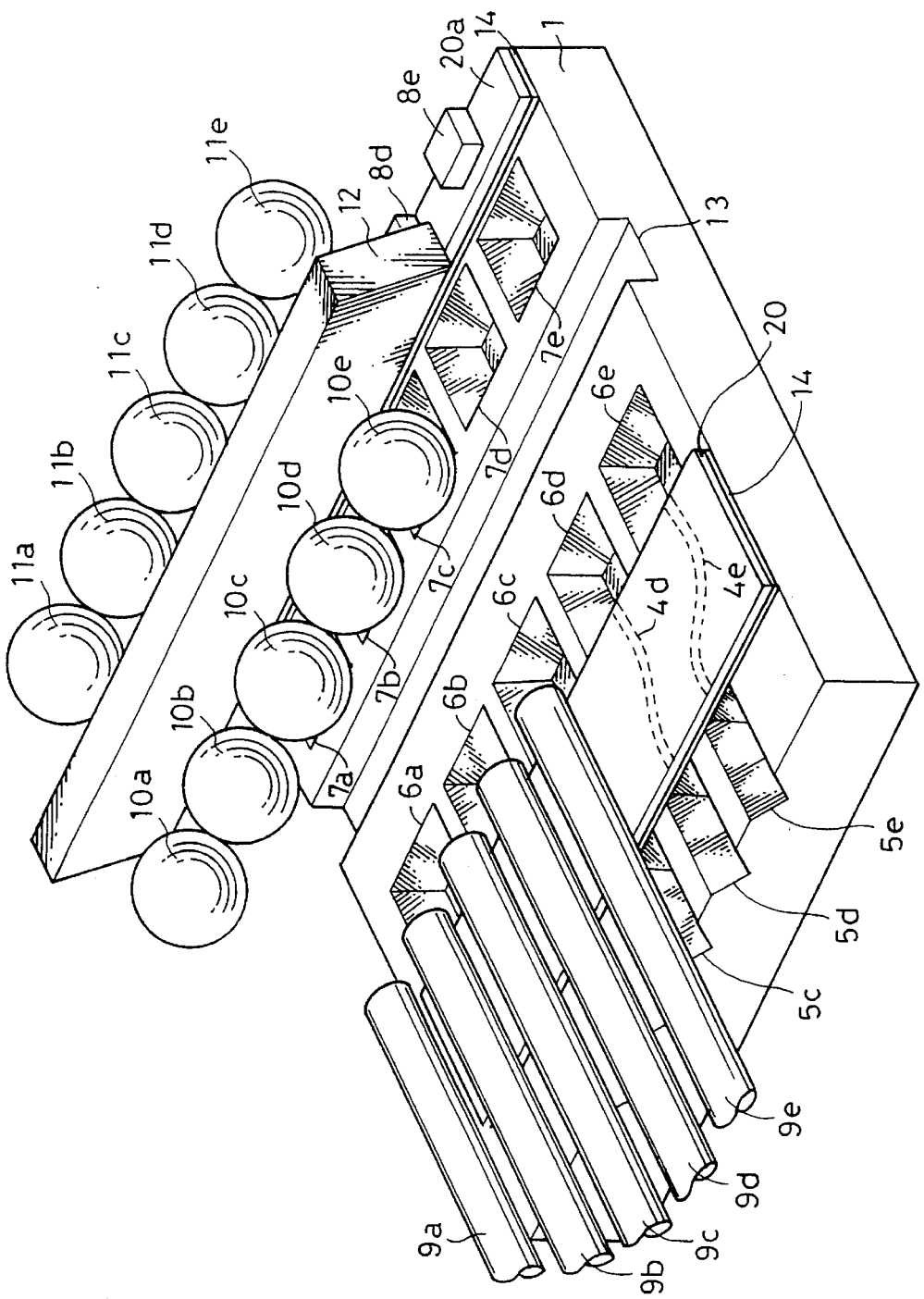
FIG. 6 is a perspective view off an integrated optical device according to a fourth embodiment of the present invention.

FIG. 6 shows an integrated optical device of the fourth embodiment. In the integrated optical device shown in FIG. 6, the optical waveguide is used as a pitch changing means for changing a 1000 µm pitch, suitable for spherical lenses, to a 250 µm pitch suitable for optical fibers. This integrated optical device forms a 5-channel parallel light source having five semiconductor lasers optically coupled no ribbon fibers having a pitch of 250 µm via an optical waveguide having a pitch convertor.

The structures of semiconductor lasers 8a to 8e and core regions 4a to 4e are the same as those of the third embodiment shown in FIG. 3 except for each core regions being separated. The semiconductor lasers 8a to 8e, spherical lenses 11a to 11e, and 10a to 10e, and the core regions 4a to 4e on the spherical lens side, are all disposed at the pitch of 1000 µm. The pitch of the core regions 4a to 4e is made narrower toward the optical fiber side, and is set to 250 µm on the side facing of the ends of the optical fibers.

Laser beams radiated from the semiconductor lasers 8a to 8e are made to have a narrowed pitch of 250 µm, and are incident onto ribbon fibers 9a to 9e aligned at a pitch of 250 µm by V grooves 5a to 5e.

In this manner, a parallel light source can be formed without any adjustment by providing a plurality of optical semiconductor devices, spherical lenses, and optical fibers. The pitch change by the optical waveguide reduces interchannel crosstalk at the electric circuit stage, compared to the case of coupling optical fibers and optical semiconductor devices at a pitch off 250 µm.

In the third and-fourth embodiments, a semiconductor laser has been used as the optical semiconductor device. If a semiconductor laser is replaced by a photodiode, a light reception device can be realized.

Next, the Fifth embodiment of the invention will be described with reference to FIGS. 7A and 7B.

Figure 7A:
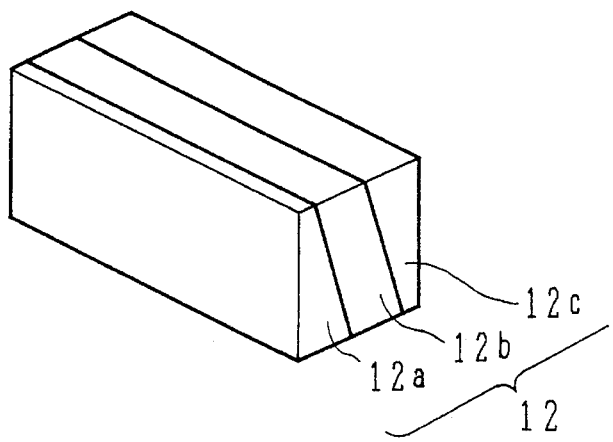
FIGS. 7A and 7B are perspective views of rectangular optical members used by an integrated optical device according to a fifth embodiment of the present invention.

FIG. 7A shows a rectangular optical member 12 of the fifth embodiment. The rectangular optical member 12 shown in FIG. 7A has a structure of a high refractive index rectangular glass plate 12b sandwiched between two low refractive index glass plates 12a and 12c.

A laser beam incident onto the incident plane of, For example, the low refractive index plate 12a refracts at the interface between the low refractive index glass plate 12a and the high refractive index glass plate 12b and at the interface between the high refractive index glass plate 12b and the low refractive index glass plate 12c, resulting in an optical axis shift. The same effect as the rectangular optical members 12 of the first to Fourth embodiments can therefore be obtained. In this embodiment, it may be acceptable that the glass plates 12a and 12c have a higher refractive index and that glass plate 12b is inclined oppositely.

The rectangular optical member 12 of this embodiment can be fitted in the guide groove 713 without any gap, thereby improving a mount precision thereof.

Figure 7B:
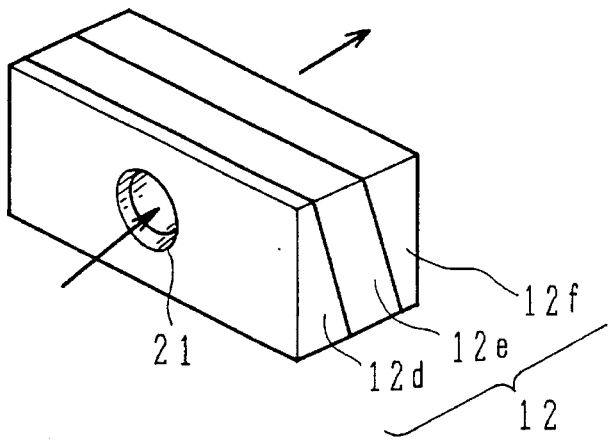

As shown in FIG. 7B, laser beam pass through holes 21 may be formed in glass plates 12d and 12f at the positions where a laser beam passes. With this structure, it is possible to use glass plates 12d, 12e, and 12f having the same refractive index, Furthermore, instead off the glass plates 12d and 12f, articles made of opaque material may be used.

Figure 8:
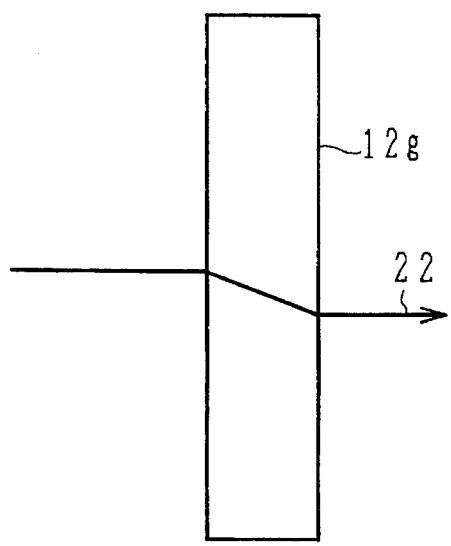
FIG. 8 is a cross sectional view of a rectangular optical member used by art integrated optical device according to a sixth embodiment of the present invention.
Figure 9:
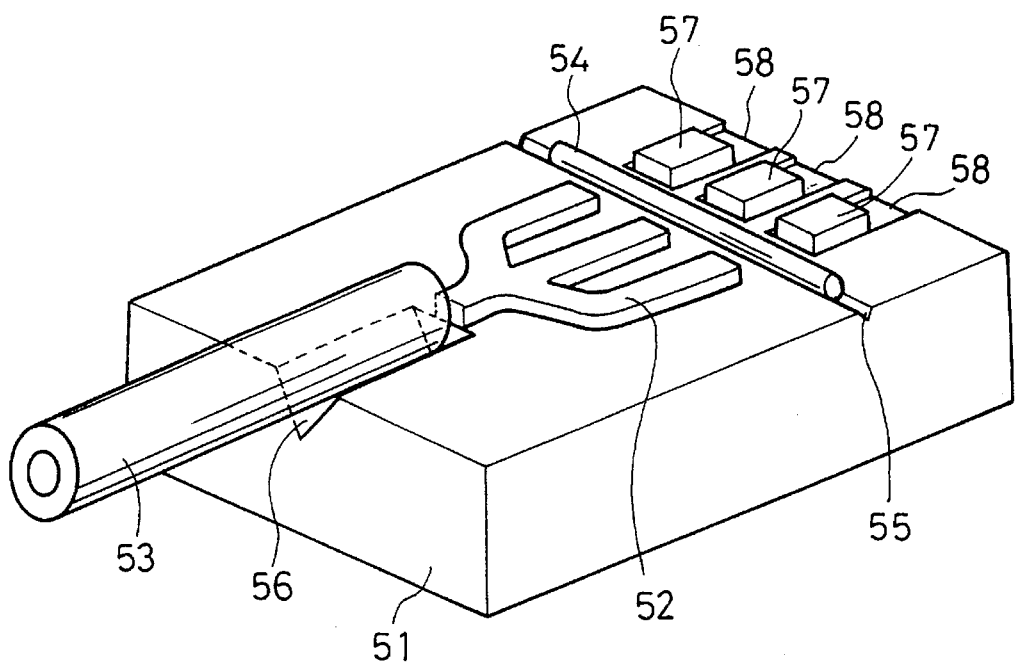
FIG. 9 is a perspective view off a conventional integrated optical device.
Figure 10A:
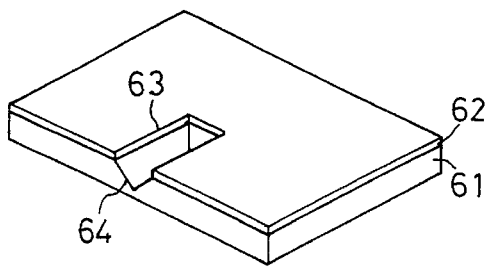
FIGS. 10A to 10F are perspective views explaining conventional methods of forming a V groove and an optical waveguide.
Figure 10D:
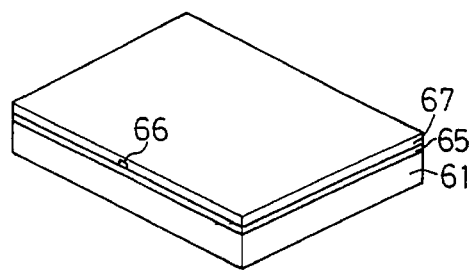
Figure 10B:
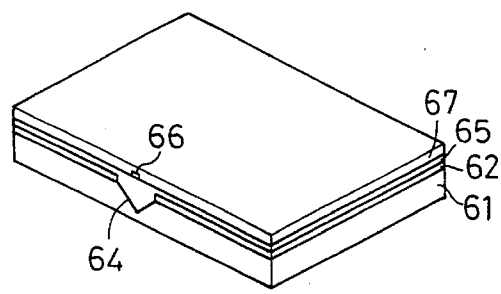
Figure 10E:
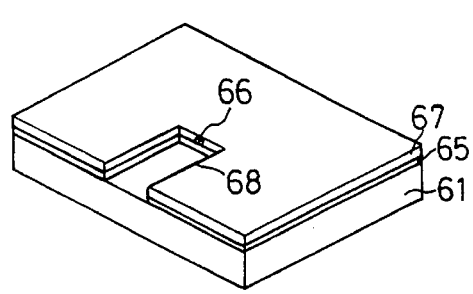
Figure 10C:
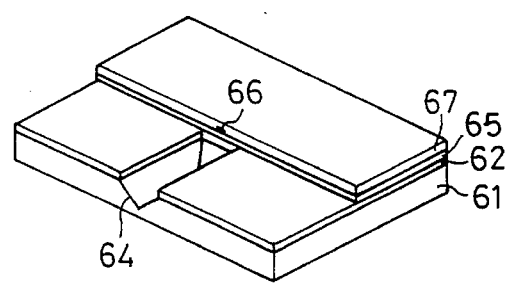
Figure 10F:
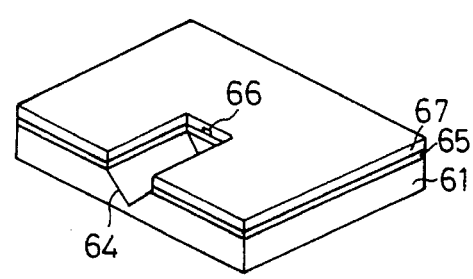
Figure 11:
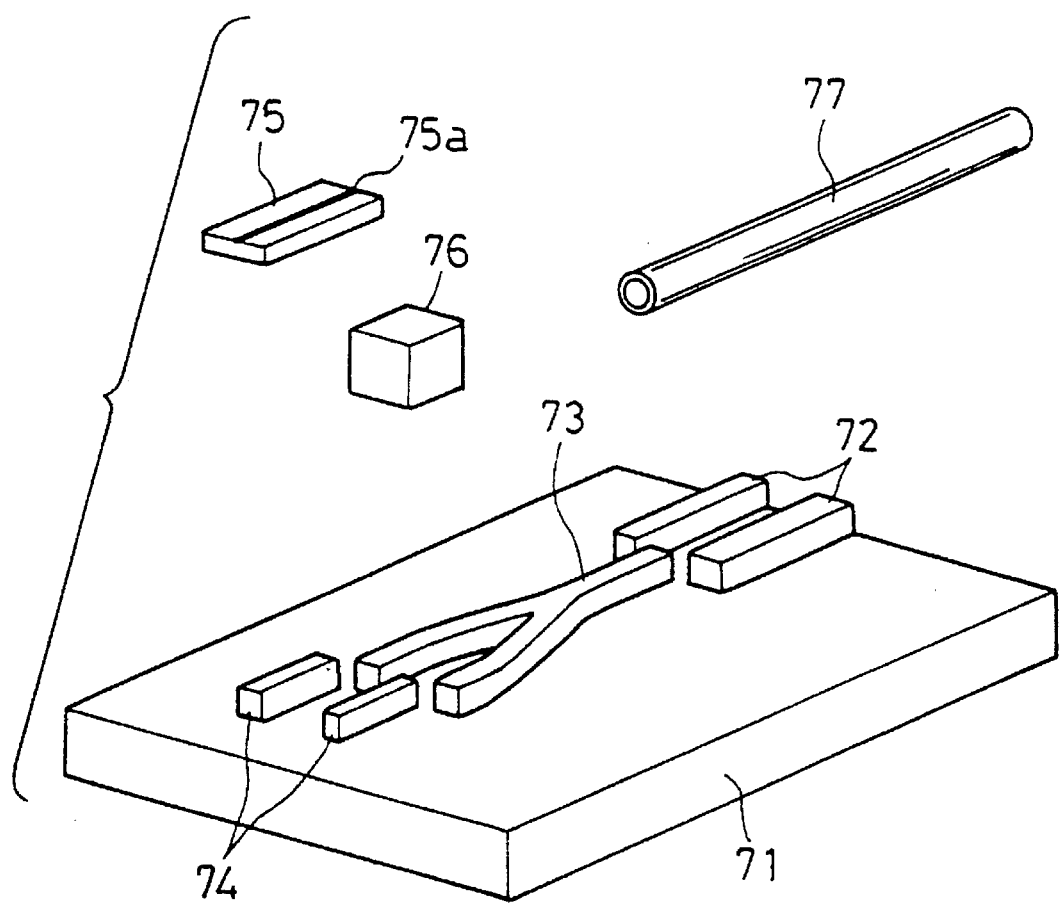
FIG. 11 is a perspective view of a conventional integrated optical device.
Figure 12:
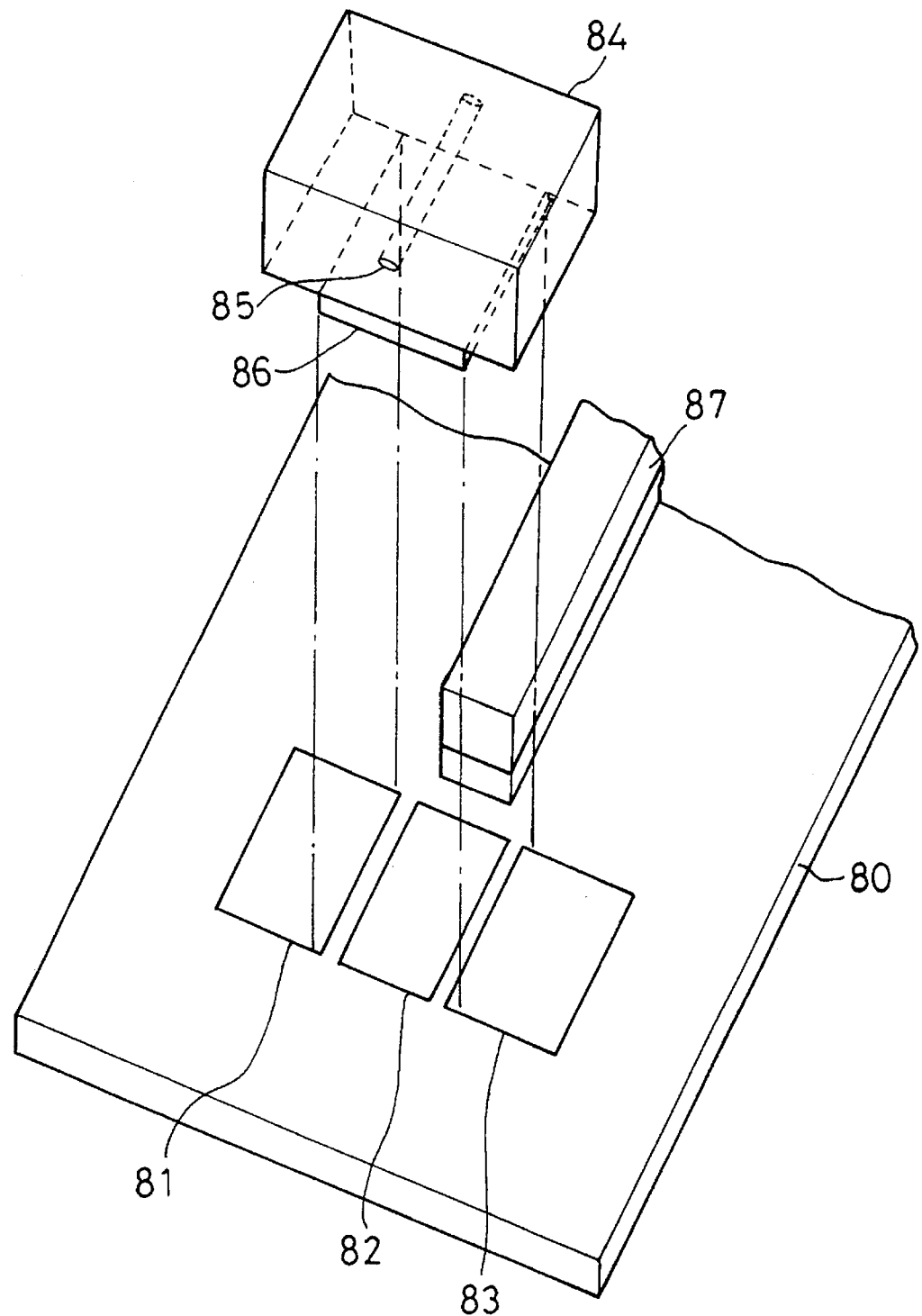
FIG. 12 is a perspective view of another conventional integrated optical device.

The sixth embodiment will be described with reference to FIG. 8 which shows a cross section of a rectangular optical member 12g cut along the plane of an optical axis 26 of the optical system. The rectangular plate optical member 12g uses futile crystal which is a material having birefringence.

Use of a material having birefringence allows the optical axis to be shifted even if the light incident and output planes are disposed perpendicular by to the optical axis of an incident light beam.

It is therefore possible to shift the optical axis simply by disposing even a relatively thin crystal perpendicularly to the optical axis. Similar by to the fifth embodiment, this rectangular optical member can be fitted in a guide groove without any gap, so that mount precision can be improved.

In this embodiment, rutile crystal has been used as a material having birefringence. Other birefringence materials such as calcite may also be used.

In the first to sixth embodiments, various types of known materials may be used for an optical waveguide. For example, such materials include organic polymer, dielectric material, amorphous semiconductor, films such as an oxidized silicon film and a film of silicon-nitride formed on a semiconductor.

The bonded substrate shown, for example, in FIG. 3C is resistant against a high temperature of about 1400° C. so that it can be used for forming a $GeO_2$ - $SiO_2$ based optical waveguide which is formed under a high temperature.

The techniques disclosed in the applications by the present inventor (Japanese Patent Application No.5-65559 filed on Mar. 24, 1993, published on Sep. 30, 1994, under Published Application Number (JP-A) 6-275870 U.S. Ser. No. 08/186,027 filed on Jan. 25, 1994, and Germany Patent Application P 4402422.3 filed on Jan. 27, 1994) may be used with the above embodiments, which are herein incorporated by reference.

The present invention has been described in connection with the preferred embodiments. The invention is not limited only to the above embodiments. It is apparent to those skilled in tile art that various modifications, improvements, combinations and the like can be made without departing from the scope of the appended claims.

I claim:

1. An integrated optical device comprising:
    a silicon substrate having a surface;
    a planar optical waveguide which is formed on a first portion of said silicon substrate and has a light guiding core region of a first, high refractive index surrounded by a cladding layer of a second, lower-refractive index and a flat top surface;
    a bonding pedestal which is formed on a second portion of said silicon substrate, different from the first portion, and has a flat top surface, the respective heights of said top flat surface, of said bonding pedestal and said planar optical waveguide, measured from the surface of said silicon substrate, being the same;
    an edge input/output type optical semiconductor device bonded on said top flat surface of said bonding pedestal, said edge input/output type optical semiconductor device being mounted on an imaginary line extending from a light input/output end of said planar optical waveguide so that said edge input/output type optical semiconductor device is aligned with said planar optical waveguide, the respective levels of the optical axes of said planar optical waveguide and said edge input/output type optical semiconductor device from the surface of said silicon substrate being different; and
    means for optically coupling said planar optical waveguide and said edge input/output type optical semiconductor device by changing a level of an optical axis, from a first to a second end thereof relative to the surface of said silicon substrate, the first and second end levels corresponding to the respective levels of the optical axes of said planar optical waveguide and said edge input/output type optical semiconductor device, relative to the surface of said silicon substrate.

2. An integrated optical device according to claim 1, further comprising:
    a V groove having a V-shaped cross section for position-aligning an optical fiber and formed on the surface of said silicon substrate along an optical axis extending in a first direction defined by the input/output ends of said planar optical waveguide; and
    an optical fiber which is fitted in, and fixed to, said V groove to provide position alignment between said optical fiber and said planar optical waveguide.

3. An integrated optical device according to claim 2, wherein said means for changing a level of an optical axis comprise a rectangular plate of a material which is transparent, relative to the wavelength of a transmission light beam, and has light incident and output planes inclined by a predetermined angle from respective optical axes of the light incident and light output planes.

4. An integrated optical device according to claim 3, wherein said means for changing a level of an optical axis further comprises:
    a first lens for collimating a light beam emitted from said edge input/output type optical semiconductor device or converging a collimated light beam into said edge input/output type optical semiconductor device;
    a first lens guide hole, formed on the surface of said silicon substrate, for position-aligning said first lens on the surface of said silicon substrate;
    a second lens for converging a collimated light beam into said planar optical waveguide or collimating a light beam emitted from said planar optical waveguide; and
    a second lens guide hole formed on the surface of said silicon substrate for position-aligning said second lens on the surface of said silicon substrate, wherein said rectangular plate is formed between said first and second lenses.

5. An integrated optical device according to claim 4, wherein said means for changing a level of an optical axis comprises an optically transparent rectangular plate having parallel, opposite light incident and light output planes, a normal direction through said plate between said light incident and output planes being inclined by a predetermined angle from the optical axes of an incident light beam and an output light beam so as to refract said incident light beam and shift, up or down, the level of said incident light beam, when emitted as said output light beam, relatively to the surface of said silicon substrate.

6. An integrated optical device according to claim 4, wherein said means for changing a level of an optical axis comprises:
    an optically transparent plate having parallel, opposite light incident and light output planes, a normal direction through said plate between said light incident and output planes being inclined by a predetermined angle from the optical axes of an incident light beam and an output light beam so as to refract said incident light beam and shift, up or down, the level of said incident light beam, when emitted as said output light beam, relatively to the surface of said silicon substrate; and
    two transparent members, having a common refractive index different from a refractive index of said transparent plate and each having a wedge-shaped cross section, sandwiching said transparent plate therebetween such that each of said two transparent members has an exposed plane disposed perpendicular to an optical axis and an opposite plane disposed in tight contact with a respective one of the light incident and light output planes of said transparent plate.

7. An integrated optical device according to claim 4, wherein said means for changing a level of an optical axis comprises an optical member which includes:

a transparent plate having parallel, opposite light incident and light output planes, a normal direction through said plate between said light incident and output planes being inclined by a predetermined angle from the optical axes of an incident light beam and an output light beam so as to refract said incident light beam and shift, up or down, the level of said incident light beam, when emitted as said output light beam, relatively to the surface of said silicon substrate; and two support members having respective, registered through holes and wedge-shaped cross sections and sandwiching said transparent plate therebetween such that each of said two support members has an exposed plane disposed perpendicular to an optical axis and an opposite plane disposed in tight contact with a respective one of the light incident and light output planes of said transparent plate, and said registered through holes of said two support members are located at a region through which a light beam is transmitted.

8. An integrated optical device according to claim 4, wherein said means for changing a level of an optical axis comprises:

an optical member comprising a transparent, birefringent plate formed of a birefringent crystal and having parallel, opposite light incident and light output planes disposed perpendicularly to the optical axis of an incident light beam;

said light incident and output planes of said transparent, birefringent plate being inclined from an optical axis of the birefringent crystal comprising said transparent, birefringent plate such that said transparent, birefringent plate refracts said incident light beam and moves said incident light beam Upwardly or downwardly relatively to the optical axis of the incident light beam as the incident light beam passes through the optical member and whereby said incident light beam is polarized rectilinearly.

9. An integrated optical device according to claim 4, further comprising a planarizing layer between said cladding layer and said silicon substrate.

10. An integrated optical device according to claim 9, wherein said planarizing layer comprises an SiO$_2$ film.

11. An integrated optical device according to claim 9, wherein said planarizing layer comprises a silicon layer.

12. An integrated optical device according to claim 9, wherein said planarizing layer comprises a two-layer structure of an SiO$_2$ film and a silicon layer.

13. An integrated optical device according to claim 4, wherein said rectangular plate comprises a transparent plate having parallel and opposite light incident and light output planes, a normal direction relatively to said light incident and light output planes being inclined by a predetermined angle from the optical axis of an incident light beam so as to refract said incident light beam and thereby shift the levels of said incident light beam upwardly or downwardly.

14. An integrated optical device according to claim 4, wherein said rectangular plate includes:

a transparent plate having parallel and opposite light incident and light output planes, a normal direction relatively to said light incident and light output planes being inclined by a predetermined angle from the optical axis of an incident light beam so as to refract said incident light beam and thereby shift the levels of said incident light beam upwardly or downwardly; and two transparent members, having a common refractive index different from a refractive index of said transparent plate and each having a wedge-shaped cross-section, sandwiching said transparent plate therebetween such that each of said two transparent members has an exposed plane disposed perpendicular to an optical axis and an opposite plane disposed in tight contact with a respective one of the light incident and light output planes of said transparent plate.

15. An integrated optical device according to claim 1, wherein said means for changing a level of an optical axis comprise a rectangular plate of a material which is transparent, relative to the wavelength of a transmission light beam, and has light incident and output planes inclined by a predetermined angle from respective optical axes of the light incident and light output planes.

16. An integrated optical device according to claim 15, wherein said means for changing a level of an optical axis further comprises:

a first lens for collimating a light beam emitted from said edge input/output type optical semiconductor device or converging a collimated light beam into said edge input/output type optical semiconductor device;

a first lens guide hole, formed on the surface of said silicon substrate, for position-aligning said first lens on the surface of said silicon substrate;

a second lens for converging a collimated light beam into said planar optical waveguide or collimating a light beam emitted from said planar optical waveguide; and a second lens guide hole formed on the surface of said silicon substrate for position-aligning said second lens on the surface of said silicon substrate, wherein said rectangular plate is formed between said first and second lenses.

17. An integrated optical device according to claim 16, wherein said means for changing a level of an optical axis comprises an optically transparent rectangular plate having parallel, opposite light incident and light output planes, a normal direction through said plate between said light incident and output planes being inclined by a predetermined angle from the optical axes of an incident light beam and an output light beam so as to refract said incident light beam and shift, up or down, the level of said incident light beam, when emitted as said output light beam, relatively to the surface of said silicon substrate.

18. An integrated optical device according to claim 16, wherein said means for changing a level of an optical axis comprises:

an optically transparent plate having parallel, opposite light incident and light output planes, a normal direction through said plate between said light incident and output planes being inclined by a predetermined angle from the optical axes of an incident light beam and an output light beam so as to refract said incident light beam and shift up or down, the level of said incident light beam, when emitted as said output light beam, relatively to the surface of said silicon substrate; and two transparent members, having a common refractive index different from a refractive index of said transparent plate and each having a wedge-shaped cross section, sandwiching said transparent plate therebetween such that each of said two transparent members has an exposed plane disposed perpendicular to an optical axis and an opposite plane disposed in tight contact with a respective one of the light incident and light output planes of said transparent plate.

19. An integrated optical device according to claim 16, wherein said means for changing a level of an optical axis comprises an optical member which includes:

a transparent plate having parallel, opposite light incident and light output planes, a normal direction through said plate between said light incident and output planes being inclined by a predetermined angle from the optical axes of an incident light beam and an output light beam so as to refract said incident light beam and shift, up or down, the level of said incident light beam, when emitted as said output light beam, relatively to the surface of said silicon substrate; and two support members having respective, registered through holes and wedge-shaped cross sections and sandwiching said transparent plate therebetween such that each of said two support members has an exposed plane disposed perpendicular to an optical axis and an opposite plane disposed in tight contact with a respective one of the light incident and light output planes of said transparent plate, and said registered through holes of said two support members are located at a region through which a light beam is transmitted.

20. An integrated optical device according to claim 16, wherein said means for changing a level of an optical axis comprises:

an optical member comprising a transparent, birefringent plate formed of a birefringent crystal and having parallel, opposite light incident and light output planes disposed perpendicularly to the optical axis of an incident light beam;

said light incident and output planes of said transparent, birefringent plate being inclined from an optical axis of the birefringent crystal comprising said transparent, birefringent plate such that said transparent, birefringent plate refracts said incident light beam and moves said incident light beam Upwardly or downwardly relatively to the optical axis of the incident light beam as the incident light beam passes through the optical member and whereby said incident light beam is polarized rectilinearly.

21. An integrated optical device according to claim 16, wherein said rectangular plate comprises a transparent plate having parallel and opposite light incident and light output planes, a normal direction relatively to said light incident and light output planes being inclined by a predetermined angle from the optical axis of an incident light beam so as to refract said incident light beam and thereby shift the levels of said incident light beam upwardly or downwardly.

22. An integrated optical device according to claim 16, wherein said rectangular plate comprises:

a transparent plate having parallel and opposite light incident and light output planes, a normal direction relatively to said light incident and light output planes being inclined by a predetermined angle from the optical axis of an incident light beam so as to refract said incident light beam and thereby shift the levels of said incident light beam upwardly or downwardly; and two transparent members, having a common refractive index different from a refractive index of said transparent plate and each having a wedge-shaped cross-section, sandwiching said transparent plate therebetween such that each of said two transparent members has an exposed plane disposed perpendicular to an optical axis and an opposite plane disposed in tight contact with a respective one of the light incident and light output planes of said transparent plate.

23. A method of forming an integrated optical device comprising the steps of:

forming an optical fiber guide groove and first and second lens guiding grooves for position-aligning lenses by selectively and anisotropically etching a main surface of a first silicon substrate;

bonding a second silicon substrate, having a planarizing layer formed on a main surface thereof to said first silicon substrate, by directing said planarizing layer to the main surface of said first silicon substrate;

removing said second silicon substrate and leaving said planarizing layer on said main surface of first silicon substrate;

forming a deposited layer planar optical waveguide by depositing, in succession, a lower cladding material layer and a core region material layer on said planarizing layer, patterning said deposited core region material layer by photolithography and depositing an upper cladding material layer;

forming bonding pads, for bonding thereto an optical semiconductor device, at a location on a top surface of said deposited layer planar optical waveguide thereby defining the location of a bonding pedestal for the optical semiconductor device;

selectively removing portions of said planar optical waveguide deposited layer and of said planarizing layer and thereby exposing said optical fiber guide groove and said first and second lens guiding grooves; and forming an optical member guide groove for position-aligning an optical member for shifting the levels of optical axes, relatively to the main surface of said first silicon substrate between said first and second lens guiding grooves.

24. A method according to claim 23, further comprising the step of position-aligning said optical member at said optical member guide groove.

25. A method according to claim 24, wherein said planarizing layer is an $SiO_2$ layer.

26. A method according to claim 24, wherein said planarizing layer is a surface silicon layer.

27. A method according to claim 24, wherein said planarizing layer is a laminated layer of a surface silicon layer and an $SiO_2$ layer.

28. An integrated optical device comprising:

a silicon substrate having a main surface;

a planar optical waveguide which is formed on a first portion of the main surface of said silicon substrate, and has a plurality of light guiding core regions, each of a first, high refractive index, a cladding layer of a second, lower index surrounding the core regions and having a flat top surface, said plurality of light guiding core regions having light input/output ports at first and second opposite sides thereof disposed at first and second, different constant pitches, respectively;

a bonding pedestal which is formed on a second portion of said silicon substrate, different from the first portion thereof, and has a flat top surface, the respective heights of said top flat surfaces of said bonding pedestal and said planar optical waveguide, measured from the surface of said silicon substrate, being the same;

a plurality of edge input/output type optical semiconductor devices bonded on said top surface of said bonding pedestal and mounted in a line with the same pitch as that of said light input/output ports of said planar waveguide facing the plurality of edge input/output type optical semiconductor devices, said edge input/output type optical semiconductor devices being mounted on optical axes extending from said light input/output ports of said light guiding core regions so that said edge input/output type optical semiconductor devices align with said light input/output ports of said light guiding core regions respectively, respective heights of optical axes of said edge input/output type optical semiconductor devices being the same, and respective heights of optical axes of said light guiding core regions being the same, and respective heights of said optical axes of said edge input/output type optical semiconductor devices and said light guiding core regions being different;

means for changing a level of an optical axis, thereby for optically coupling said light guiding core regions of said planar optical waveguide and said optical semiconductor devices, by changing the respective heights of optical axes, relative to the surface of said silicon substrate, at each said edge input/output type optical semiconductor device and said light guiding core regions of said planar optical waveguide; and a plurality of V grooves having a V-shaped cross-section for position-aligning optical fibers, formed on the surface of said silicon substrate along optical axes extending in one direction from other input/output ports of said planar optical waveguide respectively, said V grooves being arranged at a constant pitch which is smaller than that of said edge input/output semiconductor devices; and optical fibers which are fitted in, and fixed to, said V grooves to provide position alignment between said optical fibers and said light guiding core regions of said planar optical waveguide, respectively.

29. An integrated optical device comprising:

a silicon substrate having a main surface;

a planar optical waveguide which is formed on a first portion of the main surface of said silicon substrate, and has a plurality of light guiding core regions, each of a first, high refractive index and surrounded, in common, by a cladding layer of a second, lower refractive index and having a flat top surface, said plurality of light guiding core regions having respective light input/output ports at the opposite, first and second ends thereof and spaced respectively at first and second, different pitches;

a plurality of edge input/output type optical semiconductor devices positioned in a line at the same first pitch of, and facing, said light input/output ports of said first ends of said planar waveguide, said edge input/output type optical semiconductor devices being positioned with optical axes thereof aligned with respective optical axes of said first end light input/output ports of said light guiding core regions so that said edge input/output type optical semiconductor devices are aligned with said light input/output ports of said first ends of said light guiding core regions, respectively;

a plurality of V grooves, each having a V-shaped cross section for position-aligning optical fibers, formed on the surface of said silicon substrate along optical axes extending in a first common direction from the first input/output ports of said planar optical waveguide, respectively, said V grooves being arranged at a second, constant pitch which is smaller than the first pitch of said edge input/output semiconductor devices;

optical fibers which are fitted in, and fixed to, said V grooves to provide position alignment between said optical fibers and said light guiding core regions of said planar optical waveguide, respectively;

first lenses for collimating light beams emitted from said edge input/output type optical semiconductor devices or converging collimated light beams into said edge input/output type optical semiconductor devices;

first lens guide holes on the main surface of said silicon substrate for position-aligning respective said first lenses on the main surface of said silicon substrate;

second lenses for converging collimated light beams into said planar optical waveguide or collimating light beams emitted from said planar optical waveguide;

second lens guide holes on the main surface of said silicon substrate for position-aligning respective said second lenses on the main surface of said silicon substrate; and a rectangular plate between said first and second lenses and made of a material which is transparent, relatively to the wavelength of a transmission light beam, the light incident and light output planes of said rectangular plate being disposed so as to be inclined by a predetermined angle from an optical axis.

* * * * *

UNITED STATES PATENT AND TRADEMARK OFFICE
CERTIFICATE OF CORRECTION

PATENT NO. : 5,481,629
DATED : Jan. 2, 1996
INVENTOR(S) : TABUCHI

It is certified that error appears in the above-indentified patent and that said Letters Patent is hereby corrected as shown below:

TITLE PAGE: [57] ABSTRACT:
- line 1, change "(1" to --(1);--;
- line 2, delete ");"; and change "(4 )" to --(4)--.

Col. 1,  line 8, after "device" delete ",";
lines 61-62, change "wave guide." to --waveguide.--;
line 63, after "illustrated" insert --in FIGS.--;
line 64, change "Formed." to --formed.--.

Col. 2,  line 2, after "region" delete ".";
line 10, after "waveguide" insert --is--;
line 12, change "off" to --of--.

Col. 3,  line 3, change "3 mn" should read-- $3\mu m$ --.
line 4, change "off" to --of--;
line 50, change "From" to --from--.

Col. 4,  line 50, change "all" to --at--;
line 62, change "off" to --of--.

Col. 5,  line 5, change "dirt etcher" to --different--;
line 41, after "cross-sectional" delete ",";
line 42, change "First" to --first--;
line 46, change "off" to --of--;
line 53, change "off" to --of--;
line 63, change "off" to --of--.

Col. 6,  line 28, change "direct:ion" to --direction--;
line 47, after "and" insert --the--;

UNITED STATES PATENT AND TRADEMARK OFFICE
CERTIFICATE OF CORRECTION

PATENT NO. : 5,481,629
DATED : Jan. 2, 1996
INVENTOR(S) : TABUCHI

It is certified that error appears in the above-indentified patent and that said Letters Patent is hereby corrected as shown below:

Col. 6, line 53, change "off" to --of--;
line 62, change "Formed" to --formed--;
line 65, change "the-thickness" to --the thickness--.

Col. 7, line 55, change "3D)," to --3D,--;
line 61, change "will riot" to --will not--.

Col. 8, line 3, after "region" insert --,--;
line 14, change "that" to --than--.
line 38, change "off" to --of--;
line 54, change "off" to --of--;
line 57, change "off" to --of--;
line 59, change "off" to --of--;
line 63, change "BD and BE" to --3D and 3E--.

Col. 9, line 1, change "41E" to --4E--;
line 8, change "Form" should read --form--
line 41, change "lie" to --11e--;
line 51, after "similar to" insert --the first--.

Col. 10, line 5, after "pitch" insert --,--;
line 7, change "coupled no" to --coupled to--;
line 18, delete "of" (first occurrence);
line 29, change "off" to --of--;
line 30, change "and-fourth" to --and fourth--;
line 35, change "Fifth" to --fifth--;
line 42, change "For" to --for--;
line 49, change "Fourth" to --fourth--;
line 54, change "713" to --13--;
line 61, change "index," to --index.--; and change "off" to --of--.

UNITED STATES PATENT AND TRADEMARK OFFICE
CERTIFICATE OF CORRECTION

PATENT NO. : 5,481,629
DATED : Jan. 2, 1996
INVENTOR(S) : TABUCHI

It is certified that error appears in the above-indentified patent and that said Letters Patent is hereby corrected as shown below:

Col. 11, line 3, change "perpendicular by" to --perpendicularly--;
line 7, change "Similar by" to --Similarly--;
line 35, change "tile" to --the--;
line 49 (claim 1, line 11), change "surface," to --surfaces--;
line 62 (claim 1, line 23), after "device" insert --,--;
line 63 (claim 1, line 24), after "substrate" insert --,--.

Col. 13, line 41 (claim 8, line 14), change "Upwardly" to --upwardly--.

Col. 14, line 60 (claim 18, line 10), after "shift" insert --,--.

Col. 15, line 41 (claim 20, line 14), change "Upwardly" to --upwardly--.

Col. 16, line 51 (claim 28, line 4), change "substrate ," to --substrate,--.

Signed and Sealed this

Twentieth Day of August, 1996

Attest:

BRUCE LEHMAN

Attesting Officer

Commissioner of Patents and Trademarks